Sept. 15, 1925.  
J. P. FEENEY  
BALANCING MACHINE  
Filed Feb. 18, 1922  
1,553,936  
3 Sheets-Sheet 2

Fig. 2.

J. P. Feeney  
INVENTOR  
BY D. C. Davis  
ATTORNEY

Fig. 3.

Patented Sept. 15, 1925.

1,553,936

UNITED STATES PATENT OFFICE.

JOSEPH P. FEENEY, OF MOORE, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed February 18, 1922. Serial No. 537,589.

*To all whom it may concern:*

Be it known that I, JOSEPH P. FEENEY, a citizen of the United States, and a resident of Moore, in the county of Delaware and State of Pennsylvania, have invented a new and useful Improvement in Balancing Machines, of which the following is a specification.

My invention relates to balancing machines of the static and dynamic type and it has for its object to provide apparatus of the character designated which shall have mechanism arranged independently of the movable support for the rotary body to be balanced for imposing impulses upon the movable support in opposition to the impulses imposed thereon by the rotary body due to its unbalanced condition in order to ascertain the magnitude of the resultant unbalanced forces and the angular position thereof.

A further object of my invention is to provide an improved form of regulable impulse-developing means for cooperation with a movable support for a rotary body.

Apparatus embodying the features of my invention is illustrated in the accompanying drawings, forming a part of this application, in which.

There is in use a type of balancing machine which employs a vibratory supporting member movable in a predetermined path or direction for supporting a primary rotary body to be balanced and also a secondary rotary body. The secondary rotary body functions to develop couples or impulses which serve to counter-balance the couples or impulses developed by the primary rotary body due to its unbalanced condition. Means are associated with the secondary rotary body, whereby its degree of unbalance as well as the phase relationship of the resultant of unbalanced forces with respect to the resultant of unbalanced forces of the rotary body may be varied so as to bring the couples or impulses developed by the primary rotary body and by the secondary rotary body into opposition. It is characteristic of this type of machine that static balance of a rotary body must first be compensated for before the operation of dynamic balancing is begun.

Another type of balancing machine has been developed which takes care of both static and dynamic unbalance simultaneously and which is particularly useful in balancing very heavy bodies, both accurately and expeditiously. This type of machine in effect employs two balancing mechanisms, one for each end of the rotor to be balanced; and, in the operation of balancing, the movable supporting member of one of the mechanisms is held in a fixed position while that of the other is free to move. With this type of machine, the amount of unbalance and the resultant plane thereof are determined for each end of the body; and, therefore, the mass of material to be added or removed at each end of the rotor, as well as the planes in which the additions or removals take place, is merely a matter of simple computation well understood in the art. The rotor to be balanced is ordinarily provided with a circumferential series of balance openings at each end; and, in carrying out the operation of balancing, weights are inserted in various balance openings until the supporting member vibrates at a minimum, thereby localizing the resultant plane of unbalance, and then the weights are increased in the determined openings until vibration ceases. After one end is balanced in this way, the other end is then balanced. Knowing the masses which have been added to each end of the rotor, as well as the relative angles at which the masses are added, it becomes then merely a matter of computation, well understood in the art, to ascertain the resultant amount of material to be added at each end of the rotor, as well as the positions at which the additions must take place. It is, of course, necessary to stop and start the rotor each time the weights are changed.

Accordingly, it is the object of my present invention to provide a balancing machine of the second type which shall be capable of ascertaining both the magnitude and the angle of unbalance at each end of the rotor without it being necessary to start or stop the rotor, my invention employing devices arranged externally of the vibratory supporting members for developing impulses for imposition on the supporting members to oppose the impulses imposed thereon by the rotary body due to its unbalanced condition. Means are associated with the devices for changing the magnitude as well as the impulses developed thereby as well as the relative phase relationship thereof with respect to the rotary body impulses.

Referring now to the drawings for a more detailed description of my invention, I show pendulums 10 having bearings at their upper ends for supporting trunnions 12 of a rotor 13, whose static and dynamic balance is to be ascertained. Each pendulum 10 is supported by means of a suitable flexible connection 14, for example, of the I-beam type, which is secured to the lower end of the pendulum and to the frame or supporting structure 15. Suitable springs 16 are interposed between the upper ends of the pendulums 10 and the frame or supporting structure 15 for the purpose of amplifying vibrations when the rotor attains synchronous speed.

Screws 17 are provided for the purpose of holding either of the pendulums 10 in a fixed position when the other end of the rotor is being balanced.

It will be observed that each pendulum is limited to movement in a horizontal plane, the arc of movement thereof being so short as to be practically movement in a horizontal plane. It will, therefore, be apparent that, if the rotor 13 is unbalanced, two impulses will be applied thereby to each pendulum 10 for each revolution. I provide mechanism, including secondary or neutralizing rotary bodies 18, carried by movable supports or pendulums 19 for opposing movement of the pendulums 10 due to the impulses imposed upon the latter on account of the unbalanced condition of the rotor 13 being balanced. Each pendulum 19 is connected by a suitable link 20 to a pendulum 10 so that the impulses developed are transmitted from one pendulum to the other, the link having a detachable connection 21 with respect to a pendulum 10 in order that the pendulums may be disconnected for purposes hereinafter set forth.

The pendulums 19 are supported by a framework or supporting structure 15 by any suitable means, for example, by the I-beam supports 22, which are connected to the lower ends of the pendulums 19 and to the framework or supporting structure 15. Springs 23 are interposed between the upper ends of each pendulum 19 and the framework or supporting structure 15 in order to center the pendulum, as well as to amplify vibrations thereof when the neutralizing or secondary rotary bodies 18 reach synchronous speed.

The springs 16 and 23 are provided with nut-like members 24 and 25, respectively, for the purpose of varying the number of active convolutions of the springs in order to adjust the resonance thereof. The nut-like members 24 and 25 are held in adjusted positions with respect to the supporting structure by any suitable means, for example, by set screws 26 and 27, respectively.

Figure 3:
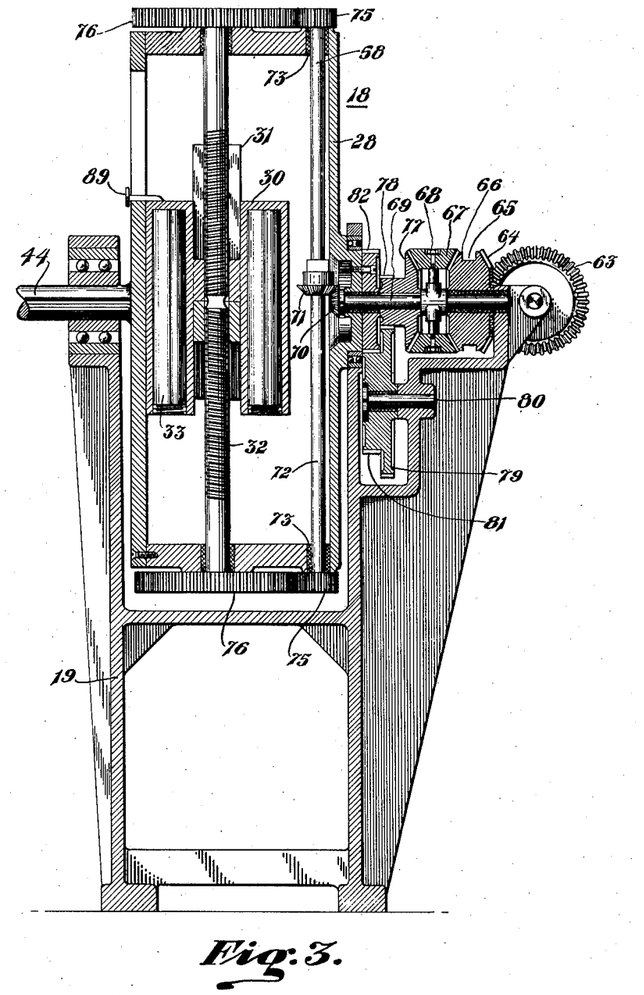
Fig. 3 is a sectional view, drawn on enlarged scale, of one of the rotary balancing devices.

Each of the secondary or neutralizing rotary bodies 18 is adapted to be driven normally in synchronism, but in an opposite direction, with respect to a rotary body 13 to be balanced and it includes a casing member 28 rotatably supported by a second pendulum 19 in the manner shown in Fig. 3.

The rotatable housing or casing 28 carries adjustable weight members 30 and 31 which are traversed transversely in opposite directions, respectively, by means of an oppositely threaded shaft 32 in order to vary the distance of the center of gravity of the weights from the axis of rotation of the casing or housing 28. Two weight members are employed one of which, for example, 30 is provided with openings to receive weights 33 of different masses, the reason for employing two weight members being that the members may be readily balanced to bring their resultant center of gravity on the axis of rotation before a set of known weights 33 are placed in position with respect to the weight members 30. In other words, without the masses or weights 33, the members 30 and 31 balance each other for all positions, so that the actual mass of the weights 33 is the only mass factor which has to be considered in determining the magnitude of the unbalanced moment developed by the secondary or neutralizing rotary body 18. By adjusting the weight members 30 and 31, with appropriate masses 33 in position, a secondary or neutralizing rotary body 18 may be unbalanced to a variable degree in order to develop impulses in the manner and for the purpose hereinafter set forth.

Figures 1, 4, 5, 6:
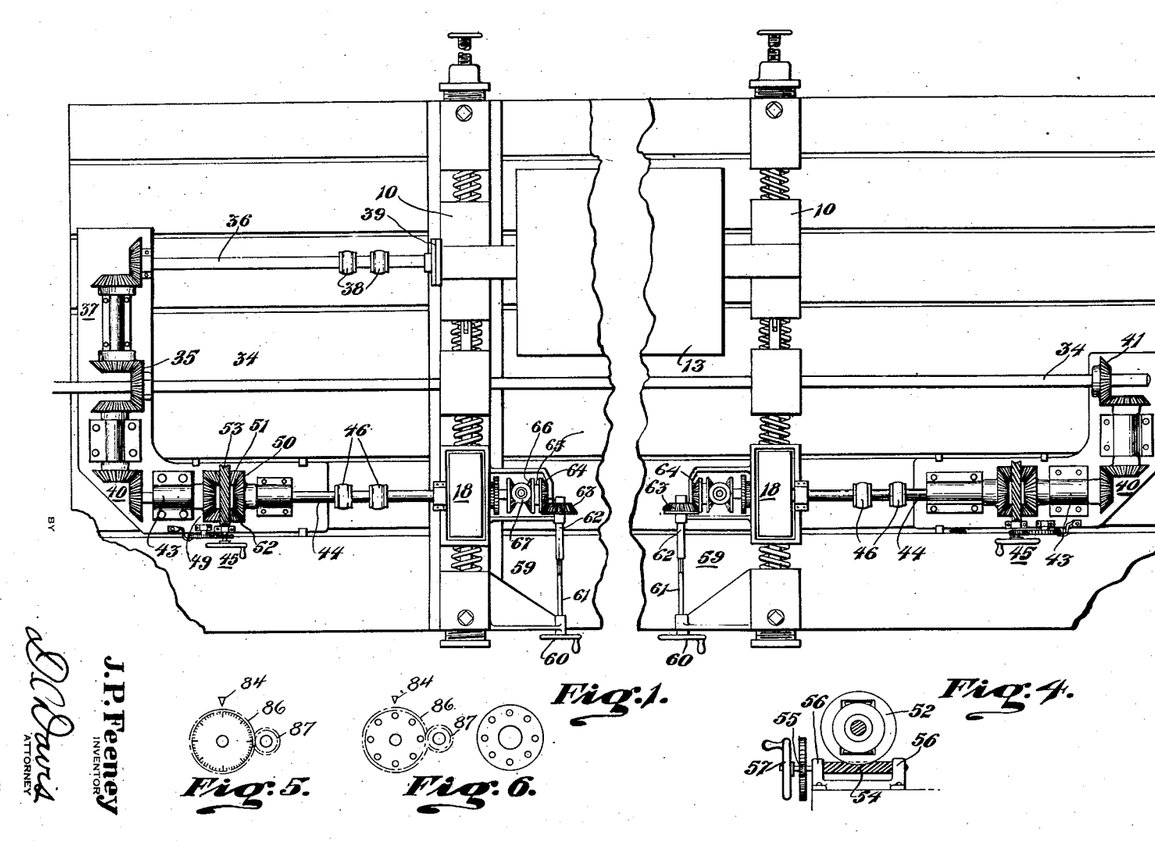
Fig. 1 is a plan view of my improved balancing machine.
Fig. 4 is a detail view of one of the phase-changing mechanisms.
Fig. 5 is a detail view of the angle-indicating mechanism associated with each phase-changing mechanism.
Fig. 6 is a detail view of a modified form of dial.
Figure 2:
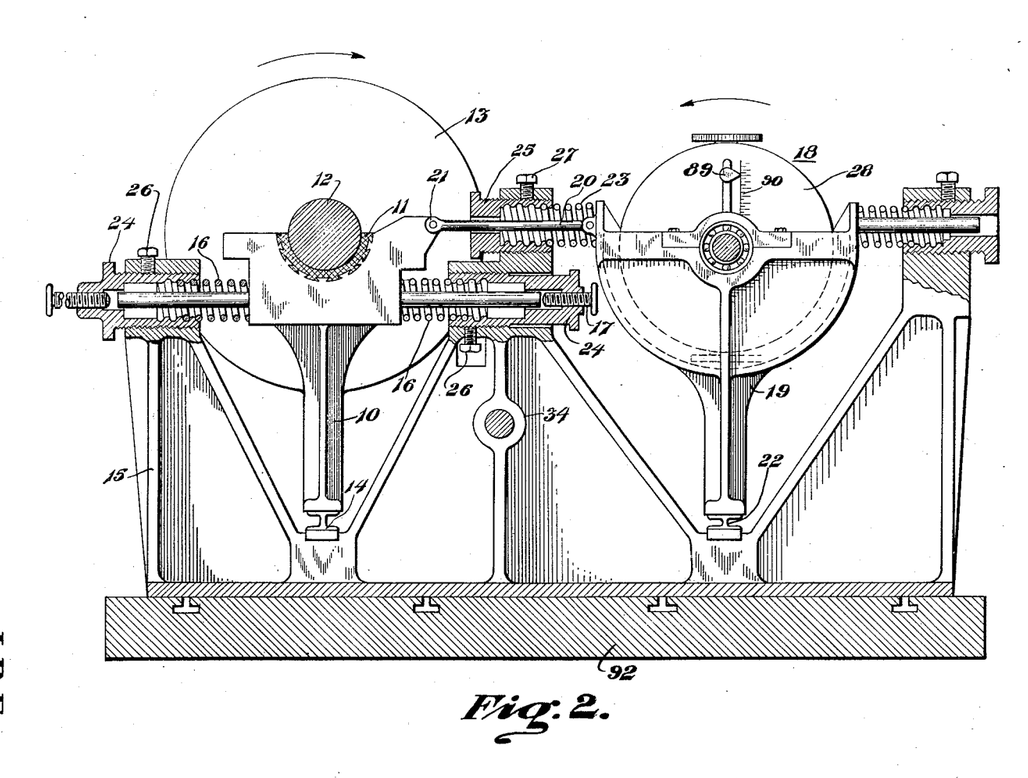
Fig. 2 is an end elevation thereof with parts shown in section.

Upon reference to Fig. 1 it will be seen that a driving shaft 34 is connected mechanically to the rotor 13 and to the secondary or neutralizing rotary bodies 18, so that the rotor and the secondary or neutralizing rotary bodies rotate in synchronism and in opposite directions. Any suitable mechanical connections may be employed for driving the rotor 13 and the secondary rotary bodies 18, and I show a shaft 34 mounted below the axes of these rotary elements and connected to the latter by gearing now to be described.

Referring to Fig. 1, I show a bevel gear 35 on the shaft 34 which drives the shaft mechanism 36 through a suitable bevel gear train 37. The shaft mechanism includes flexible couplings 38, in order to permit vibrational movements of the rotor 13, and it is connected to one of the rotor trunnions by any suitable coupling 39. The bevel gearing 35 also drives the shaft mechanism for one of the neutralizing mechanisms 18 by means of a bevel gear train 40. The other neutralizing mechanism 18 is operated in a similar manner by a bevel gear 41, connected to the shaft 34, and operating a similar bevel gear train 40.

The shaft mechanisms for the secondary or neutralizing rotary bodies 18 include shaft sections 43, driven by the bevel gear trains 40, and which are connected to shaft sections 44 by means of suitable phase-changing mechanisms 45. The shaft sections 44 are connected to the secondary or neutralizing rotary bodies 18 and they include flexible couplings 46 in order to permit vibrational movements of the secondary or neutralizing rotary bodies.

Each phase-changing mechanism 45 comprises a driving bevel gear 49, connected to a shaft section 43 and adapted to drive a bevel gear 50, connected to a shaft section 44, by means of a plurality of interposed pinions 51 supported by a carrier 52. The carrier is provided with an exterior worm gear 53 which meshes with a worm 54, carried by a worm shaft 55, which is journaled in suitable bearings 56 and operated by a hand-wheel 57. Either shaft section 44, and, therefore, the corresponding secondary or neutralizing rotary body 18, may be caused to lead or lag with respect to a shaft section 43, and, therefore, with respect to the rotary body 13, merely by turning the associated carrier 52 in one direction or the other. It will be noted that the bevel gear trains 40 and the phase-changing mechanisms 45 are so arranged that the secondary or neutralizing rotary bodies 18 rotate oppositely to the body 13.

Mechanisms 59 are associated with the secondary or neutralizing rotary bodies 18 so that the impulses developed by the latter may be changed in magnitude while the balancing machine is in operation. Each mechanism 59 comprises a hand-wheel 60, supported by a framework 15 and connected to a shaft 61 having a slip-joint connection with respect to a shaft section 62 carrying a bevel gear 63, which meshes with the bevel gear portion 64 of the double bevel gear 65, the other bevel gear portion 66 of the latter gear being in mesh with the bevel pinions 67 carried by the spider 68 which is secured to a shaft 69.

Each shaft 69 is co-axially arranged with respect to the housing or casing 28 of a secondary or neutralizing rotary mechanism 18, it is suitably journaled with respect thereto, and it carries, at its inner end, a bevel pinion 70, meshing with the bevel gear 71, carried by the diametral or cross-shaft 72, journaled at 73 in the housing or casing 28 and carrying, at its ends, spur pinions 75 meshing with the spur gears 76 carried by the cross-shaft 32. The pinions 67 mesh with the bevel gear 77, journaled on the shaft 69, and having its hub provided with a pinion 78 meshing with the gear 79 of a double gear journaled on the stud 80. The double gear carries the gear portion 81 which meshes with the gear 82, secured to the casing 28. The gear 82 rotates with the casing 28 and drives through the gears 81, 79, and 78 to operate the bevel gear 77, which meshes with the bevel pinions 67 and causes the latter to move about the gear portion 66 with one-half of the angular velocity of the bevel gear 77.

From the mechanism described, it will be apparent that the shaft 69 should move at the same angular velocity as and with the casing, otherwise the weight members 30 and 31 would be moved. On the other hand, the shaft 72 should be capable of movement with respect to the casing 28, while the machine is in operation, in order to vary the moment arm of the weights. In order that the first condition may be fulfilled, the gears 82, 81, 79, and 78 have such relative sizes that the gears 78 and 77 rotate with double the angular velocity of and in the same direction as the casing 28 and the connected gear 82. As the bevel gear 77 rotates at double the angular velocity of and in the same direction as the casing 28, the pinions 67 have an orbital velocity equal to that of the casing 28; and therefore, the shaft 69 is caused to move with the casing 28. If the hand-wheel 60 is turned in one direction or the other, the fulcrum gear 66 is caused to move correspondingly; and, whenever the latter gear is moved, relative movement of the casing 28 and the shaft 69 takes place, with the result that the shaft 32 is rotated and the weight members 30 and 31 are moved. Therefore, any desired adjustment of the weight members 30 and 31, in order to vary the distance of the center of gravity thereof with respect to the axis of rotation of the casing 28, may take place while the machine is in operation, it being merely necessary to turn the hand-wheel 60 in one direction or the other for this purpose.

Each phase-changing device 45 has indicating means associated therewith in order to indicate the angle which a secondary neutralizing or rotary member 18 has been caused to lead or lag with respect to the rotor 13 from the initial relative setting of these parts. For example, as shown in Fig. 5, indicating apparatus of this character may take the form of a stationary pointer 84 and a relatively movable dial 85. The dial may be carried by a gear 86 which meshes with the gear 87 on the shaft 55. The ratio of the gears 86 and 87 is such that the dial will move through 360 degrees for a relative movement of 360 degrees of the body 13 and a secondary or neutralizing rotary body 18. The dial 86 may be graduated in degrees or a dial having indications corresponding to the balancing openings in the end of a rotor may be used. See Fig. 6, which shows diagrammatically one end of a rotor 13 having balance openings and a dial having corresponding indications. If a rotor having a different number of balance openings is to be balanced, then a dial having a like number of indications is selected. This simplifies, from a mechanical standpoint, the location of the positions of unbalance, as well as the addition of masses to the proper balance opening or openings in order to neutralize any condition of unbalance.

The magnitude of the unbalancing moment or impulse developed by a secondary or neutralizing rotary body 18 is indicated by a pointer 89, associated with an adjustable weight member 30 and cooperating with a scale 90 on a casing 28.

In order that bodies to be balanced of different lengths may be accommodated, each of the framework or supporting members 15 is adjustably connected in any suitable manner with respect to the supporting bedplate 92.

Apparatus made in accordance with my invention operates as follows: A rotor 13 is placed in the supporting bearings of the pendulums 10 and the links 20, normally connecting the pendulums 10 and 19, are disconnected. The machine is then set in operation in order to determine whether or not the body 13 is in static and dynamic balance. If the body is not balanced the pendulums 10 will vibrate. Should the preliminary rotation of the rotary body 13 indicate that it is out of balance, the links 20 are connected to the pendulums 10 and the springs 16 and 23 are adjusted to secure resonance at the balancing speed.

In the operation of balancing, one pendulum 10 is fixed by means of screws 17 and the other pendulum is free to oscillate. The corresponding neutralizing or rotary body 18 is then unbalanced to a slight extent and the corresponding phase-changing mechanism 45 is operated until the rotor 13 and the secondary or neutralizing rotary body 18 vibrate to a maximum extent, the maximum vibration being of easy determination and observation. It will, of course, be apparent that the maximum vibration will take place when the impulses of the body being balanced and of the secondary or neutralizing rotary body act together in the same direction. Also it will be apparent that maximum opposition would be secured if the secondary or neutralizing rotary body 18 was caused to move 180 degrees from the maximum vibration setting. Accordingly, the phase-changing mechanism 45 is operated so as to secure this 180 degree movement. After the latter movement is effected, it is very likely that vibration will continue, due to the smaller impulse developed by the secondary or neutralizing rotary body. Therefore, in order to damp out or nullify vibrations, the impulses developed by the secondary or neutralizing rotary body 18 are increased until they are equal to those developed by the body being balanced.

The impulses developed by the secondary rotary bodies are readily adjusted while the machine is in operation by operating the hand-wheel 60 which operates through shafts 61 and 62, and the gears 63, 64, 66, 67, 70, 71, 75, and 76 to operate the cross-shaft 32 to vary the position of the weight members 30 and 31, the gears 67 being caused to revolve about the axis of the casing 28 and with the same angular velocity as the latter by means of a speed increasing train comprising a gear 82, connected to the casing 28, and operating through gears 81, 79, and 78 to drive the bevel gear 77 at twice the angular velocity of the casing 28 and the gear 82. This arrangement of gearing gives an orbital velocity for the pinions 67 exactly equal to that of the casing 28. Therefore, as long as the gear 66 is stationary, the shaft 69 rotates with the casing 28; but, when the gear 66 is moved, either in one direction or the other, the shaft 69 is caused to move relatively to the casing 28, and the weight members 30 and 31 are consequently moved. The weight members 30 and 31 may, therefore, be adjusted to any desired degree in either direction, while the machine is in operation, merely by moving the hand-wheel 60. If the maximum outward adjustment of the weight members 30 and 31 develops an impulse which is insufficient to counterbalance the impulse of the body being balanced, larger masses 33 may be placed in the weight members 30.

After the magnitude and position of unbalance at one end of the rotor are determined in the manner referred to, the latter end is then fixed and the other end is freed in order to determine the magnitude and position of unbalance thereat.

After the magnitude and position of unbalance are determined for each end of the body, it is necessary to compute, not only the exact masses to be added or removed at each end of the rotor, but also the positions at which the additions or removals are to take place. It is customary to provide a circumferential series of balance openings in each end of a rotor being balanced in which masses are added in order to place the body in static and running balance. In other words, the unbalancing forces or disturbances are regarded as being located in the planes of the balance openings and the added weights act in the planes of the balance openings to counter-balance the unbalanced forces effective in those planes. With a balancing machine, such as I have described, the magnitude of the unbalancing impulse may be readily ascertained from a reading of the indicator 89 with respect to the scale 90 considered with the mass of the weights 33.

The magnitude of an impulse determined in this way does not represent the exact unbalanced action in the plane of the balance openings at the particular end of the rotor being balanced for the reason that it is impracticable to have the impulses transmitted from the rotary body in the plane of the balance openings. In other words, it is necessary to have the rotor supported by journals which fit bearings carried by the pendulums 10 and the latter are utilized for the purpose of transmitting impulses to the secondary rotary bodies. Since the planes of the balance openings at each end of the rotor are spaced apart from the median planes of the bearings, it is obvious that an impulse observed at one end of the machine represents a resultant of the actual unbalance at that end and of the unbalance at the other end effective at the first end. The effect of unbalance of the end adjacent to the fixed bearing at the free end is in the ratio of the distances of the plane of the balance openings near the fixed bearing from the median plane of the fixed bearing to the plane of the balance openings at the free end of the rotor from the median plane of the fixed bearing. It is, therefore, necessary to resolve each observed impulse into two components, one corresponding to the actual unbalance at the end of the rotor under observation, and the other corresponding to the effect of unbalance at the fixed end at the free end. This problem is capable of ready solution, as may be seen from the copending application of Alexander T. Kasley, Serial No. 564,731 filed May 31, 1922 and assigned to the Westinghouse Electric & Manufacturing Company (Case 6041), and from Chapter 5 of Unwin on Machine Design, Part 2, 1912.

From the foregoing, it will be evident that I have devised a balancing machine which is capable of determining static and dynamic balance together and while the machine is continuously operated. Also, as the means for imposing counteracting impulses on the rotary body supporting pendulums are arranged externally of the latter, the construction of the pendulums is mechanically simple.

While I have shown my invention in but one form, it will be obvious to those skilled in the art that it is not so limited but is susceptible of various other changes and modifications, without departing from the spirit thereof and I desire, therefore, that only such limitations shall be placed thereupon as are imposed by the prior art or as are specifically set forth in the appended claims.

What I claim is:

1. In a balancing machine, the combination of a movable support for a rotary body to be balanced and movable in a predetermined path due to impulses created by the unbalanced condition of the body and means rotatable in synchronism with the body arranged externally of the movable support and operative to impose impulses thereon in opposition to the impulses due to the unbalanced condition of the body.

2. In a balancing machine, the combination of a movable support for a rotary body to be balanced and movable in a predetermined path due to impulses created by the unbalanced condition of the body, means rotatable in synchronism with the body arranged externally of the movable support and operative to impose impulses thereon in opposition to the impulses due to the unbalanced condition of the body, and means for changing the magnitude and phase of the externally developed impulses.

3. In a balancing machine, the combination of a movable support for a rotary body to be balanced and movable in a predetermined path due to impulses created by the unbalanced condition of the body, means arranged externally of the movable support and operative to impose impulses thereon in opposition to the impulses imposed due to the unbalanced condition of the body, means for rotating the unbalanced body and the impulse-developing means in synchronism, and means cooperating with the impulse-developing means to change the magnitude and the phase relationship of the impulses developed thereby with respect to the impulses developed in the body due to its unbalanced condition so that the impulses may be brought into opposition to effect a balanced condition.

4. In a balancing machine, the combination of a movable support for a body to be balanced and movable in a predetermined path due to impulses created by the unbalanced condition of the body, mechanism arranged externally of the support for developing impulses and rotatable in synchronism with the body, means for connecting said mechanism with the movable support, means for rotating the body and operating the mechanism in synchronism, and means for causing said mechanism to lead or lag with respect to said body, whereby the impulses developed by the mechanism may be brought into opposition to the impulses developed by the body.

5. In a balancing machine, the combination of a movable support for a body to be balanced and movable in a predetermined path due to the impulses created by the unbalanced condition of the body, a second movable support, a second rotary body carried by the second movable support and capable of being unbalanced so as to cause the second movable support to move in the same direction as the first movable support, and means for connecting the supports.

6. In a balancing machine, the combination of a pendulum for supporting a body to be balanced and movable in a predetermined direction, a second pendulum movable in the same direction as the first pendulum, means for connecting the pendulums, rotary mechanism carried by the second pendulum and capable of being unbalanced so as to impose impulses upon the second pendulum, means for securing synchronous operation of the body and the rotary mechanism, means for changing the phase relationship of the body and the mechanism, whereby the developed impulses may be brought into opposition, and means for varying the degree of unbalance of the rotary mechanism, whereby the latter may be caused to develop impulses equal in magnitude to those developed by the body.

7. In a balancing machine, the combination of independently movable supports for a rotary body to be balanced and movable in predetermined paths due to the impulses developed by the unbalanced condition of the body and means rotatable in synchronism with the body arranged externally of each support for developing impulses in the path of movement thereof, whereby movement of the supports may be stopped.

8. In a balancing machine, the combination of independently movable supports for a body to be balanced and movable in predetermined paths due to the impulses developed by the unbalanced condition of the body, means arranged independently of each movable support for developing and imposing impulses on the latter in the path of movement thereof, and means cooperating with the last-named means, whereby the magnitude and the timing of the impulses developed by the said means may be so varied that they may be brought into opposition and equality with respect to the impulses developed due to the unbalanced condition of the body.

9. In a balancing machine for determining static and dynamic balance, the combination of independently movable supports for a body to be balanced and movable in predetermined paths due to the impulses developed by the unbalanced condition of the body, means for holding the supports in fixed position in order that one support may be held fixed while the other is movable for carrying out the balancing operation, and means arranged independently of the supports and operative in synchronism with the body to impose impulses upon the supports in opposition to the impulses imposed thereon due to the unbalanced condition of the body.

10. In a balancing machine for determining static and dynamic balance, the combination of independently movable pendulums for supporting a body to be balanced and movable in predetermined directions due to impulses developed by the unbalanced condition of the body, a second pendulum for each of the first pendulums arranged to move in the same directions as the latter, means for connecting the first and second pendulums, rotary mechanism carried by each of the second pendulums, means for rotating the body and the rotary mechanisms in synchronism, means for causing each of the rotary mechanisms to lead or lag with respect to said body, so as to cause the impulses developed by the body and said mechanism to be brought into opposition, and means for varying the degree of unbalance of each of the rotary mechanisms, whereby impulses may be developed by the latter equal to those developed by the body being balanced.

11. In a balancing machine for determining static and dynamic balance, the combination of independently movable primary supports for a body to be balanced and movable in predetermined directions due to impulses developed on account of the unbalanced condition of the body, means for holding the primary supports in fixed positions in order that one support may be held fixed while the other is movable in order that the balancing operation may be carried out, secondary supports movable in the same directions as the primary supports, rotary mechanisms carried by the secondary supports for developing impulses for imposition on the secondary supports, means for connecting the primary and secondary supports, whereby the impulses developed due to the unbalanced condition of the body and of the rotary mechanisms may be brought into opposition, means for rotating the body and the rotary mechanisms in synchronism, means for causing the rotary mechanisms to lead or lag with respect to the body so as to bring the impulses developed thereby into direct opposition, and means cooperating with the rotary mechanisms to vary the degree of unbalance thereof, whereby the impulses developed thereby may be varied to equal those developed by the body due to its unbalanced condition.

12. In a balancing machine for determining static and dynamic balance, the combination of pendulums for supporting ends of a rotary body to be placed in static and dynamic balance and movable in predetermined directions, means for holding one pendulum while the other is movable in carrying out balancing operations, means rotatable in synchronism with the body for developing impulses in the direction of movement of the pendulums, transmitting means between the latter means and the pendulums, and means cooperating with the last-named means for varying the magnitude and timing of the impulses so that the latter impulses may be brought into opposition with the impulses imposed upon the pendulums due to the unbalanced condition of the body.

13. In a balancing machine for determining static and dynamic balance, the combination of pendulums for supporting a body to be balanced and movable in predetermined directions due to the impulses developed by the unbalanced condition of the body, a second pendulum opposite to each of the first pendulums and movable in a like direction, means for connecting the first and second pendulums whereby they may be moved together, a rotary mechanism carried by each of the second pendulums, means for driving the rotary body and the rotary mechanisms normally in synchronism, means for causing the rotary mechanisms to lead or lag with respect to the rotary body, and means for unbalancing the rotary mechanisms whereby impulses may be developed by the latter to oppose the impulses developed by the rotary body when the rotary body and a rotary mechanism bear to each other the proper angular relationship.

14. In a balancing machine, a vibratory supporting member for a rotary body to be balanced, a secondary rotary body having adjustable weight members, a vibratory supporting member for the secondary rotary body, means for connecting the vibratory supporting members, means for operating the rotary body being balanced and the secondary rotary body in synchronism, and mechanism for changing the moment arm of the weight members while the machine is in operation.

15. In a balancing machine, a vibratory supporting member for a rotary body to be balanced, a secondary rotary body having adjustable weight members, a vibratory supporting member for the secondary rotary body, means for connecting the vibratory supporting members, means for operating the rotary body being balanced and the secondary rotary body in synchronism, mechanism for changing the phase relationship of the secondary rotary body with respect to the rotary body being balanced while the machine is in motion, and mechanism for changing the moment arm of the weight members while the machine is in motion.

16. In a balancing machine, a stationary member, a movable member for supporting a body to be balanced, mechanism carried by the stationary member for yieldingly resisting movement of the member due to the unbalanced condition of the body, means for applying energy to said mechanism from an outside source, and means for controlling the application of energy to said mechanism whereby the latter may cooperate with the body to prevent movement thereof due to its unbalanced condition.

17. In a balancing machine, the combination of a stationary member, a movable member for supporting a body to be balanced and movable in a predetermined path due to the unbalanced condition of the body, means for rotating the body, mechanism carried by the stationary member for resisting movement of the movable member, means for energizing said mechanism from an outside source and operating in a definitely timed relation with respect to the rotary body, and means for causing the period of energization to lead or lag with respect to a given circumferential position of said body so that the forces applied by said mechanism may be brought into opposition to the forces developed by the unbalanced body.

18. In a balancing machine, the combination of a stationary member, a member for supporting a body to be balanced and movable in a predetermined path due to the unbalanced condition of the body, means for rotating the body, mechanism carried by the stationary member for resisting movement of the movable member, means for energizing said mechanism from an outside source, said mechanism being operative in definitely timed relation with respect to the rotary body, means for causing the period of energization to lead or lag with respect to a given position on said body so that the forces applied by said mechanism may be brought into direct opposition to the forces developed by the unbalanced body, means for determining the angle of lead or lag, and means for controlling and indicating the amount of energy supplied to the mechanism for suppressing vibration of the rotary body due to its unbalanced condition.

19. In a balancing machine, the combination of a movable member for supporting a rotary body to be balanced, means permitting the movement of said body in a predetermined path due to the unbalanced condition of the body, a stationary support, motor means for resisting movement of the movable member, and means carried by the stationary support for energizing the motor means, said means being operative in a definite timed relation to the rotation of the body.

20. In a balancing machine, the combination of a vibratory member for supporting a body to be balanced and means for developing impulses rectilinearly for imposition on said vibratory member to oppose vibration thereof due to the impulse of unbalance of the body.

21. In a balancing machine, the combination of a vibratory member for supporting a body to be balanced, means for developing impulses rectilinearly for imposition on said vibratory member, and means for varying the timing of the impulses with respect to rotation of the body.

22. In a balancing machine, the combination of a vibratory member for supporting a body to be balanced, means for developing impulses rectilinearly for imposition on said vibratory member, means for varying the timing of the impulses with respect to the rotation of the body, and means for varying the magnitude of the impulses.

In testimony whereof, I have hereunto subscribed my name this 26 day of January, 1922.

JOSEPH P. FEENEY.